United States Patent [19]

French

[11] 4,328,420

[45] May 4, 1982

[54] TANDEM MASS SPECTROMETER WITH OPEN STRUCTURE AC-ONLY ROD SECTIONS, AND METHOD OF OPERATING A MASS SPECTROMETER SYSTEM

[76] Inventor: John B. French, 4 Thornbank Rd., Thornhill, Ontario, Canada

[21] Appl. No.: 173,217

[22] Filed: Jul. 28, 1980

[51] Int. Cl.[3] .............................................. B01D 59/44

[52] U.S. Cl. .................................... 250/282; 250/288; 250/292

[58] Field of Search ............... 250/281, 282, 284, 292, 250/296, 288, 396 R

[56] References Cited

U.S. PATENT DOCUMENTS 3,147,445 9/1964 Wuerker et al. .................... 250/292

4,023,398 5/1977 French et al. ....................... 250/288

4,234,791 11/1980 Enke et al. .......................... 250/281

*Primary Examiner*—Bruce C. Anderson

*Attorney, Agent, or Firm*—Rogers, Bereskin & Parr

[57] ABSTRACT

A tandem quadrupole mass spectrometer system in which an AC-only section is close coupled with a standard AC-DC section with the rods of the two sections closely longitudinally adjacent each other. The rods of the AC-only section are of open structure, formed by thin wires, to allow gas to be introduced into the system and to escape through the open structure rods. The system is particularly suited for use with a tandem quadrupole system consisting of three sections, namely an AC-DC section, an AC-only section, and an AC-DC section all close coupled, with a target gas introduced into the AC-only section to induce CID of ions traveling through the system. In one arrangement the rods of the AC-only section have solid center portions between which the target gas is introduced, and open structure end portions through which the target gas may flow away so that little of it enters the end AC-DC sections. In another embodiment, gas is beamed directly through a short open structure section by placing an appropriate gas dynamic beam forming device such as a collimated hole structure or a gas dynamic free jet on one side and an appropriate vacuum pumping arrangement on the other.

17 Claims, 14 Drawing Figures

TANDEM MASS SPECTROMETER WITH OPEN STRUCTURE AC-ONLY ROD SECTIONS, AND METHOD OF OPERATING A MASS SPECTROMETER SYSTEM

This invention relates to a tandem mass spectrometer system with open structure AC-only rod sections.

In a paper published at page 2274 of the 1978 issue of Journal of the American Chemical Society, R. A. Yost and C. G. Enke have disclosed that a tandem mass spectrometer system may be used to create ion species from a sample, select one individual ion species, fragment that species, and obtain the mass spectrum of the fragments. The paper discloses that a quadrupole mass filter, AC-only quadrupole section, and a second quadrupole mass filter area arranged in series. Gas is introduced into the center quadrupole section to produce collision induced dissociation. Each quadrupole is arranged in its own cylindrical container with end apertures and operates separately. With a system such as this, it is found that ion signal losses are very large as the ions travel from one quadrupole to the next, and therefore the sensitivity of the apparatus is greatly reduced.

In one of its aspects the present invention provides a structure which provides greatly increased sensitivity by permitting close coupling of the tandem sections. According to the invention the rods of the adjacent sections are located closely adjacent each other, and the gas introduced into the AC-only section is largely removed, before it can enter a mass filter section, by forming the rods or a portion of the rods of the AC-only section as open structures, so that the gas can be removed directly through the rods as well as between them.

The open rod structure of the AC-only section may also be used in conventional mass spectrometers, where ions from a gassy source outside a vacuum chamber are admitted with gas into the vacuum chamber and are guided through the vacuum chamber to a mass spectrometer in the chamber. Such an arrangement is shown in U.S. Pat. No. 4,148,196 of J. B. French, N. M. Reid, and J. A. Buckley. Open structure AC-only rods may be used as will be described to guide the ions from the aperture of the vacuum chamber to the mass spectrometer.

It is noted that Brubaker and others have disclosed that short AC-only rod sections placed between an ion source and the AC-DC mass filter can improve ion transfer efficiency. One aspect of the present invention however combines with this known feature the concept of open structure AC-only rods so that ions from very gassy sources can be more efficiently transferred into the AC-DC mass filter while the unwanted gas will rapidly disperse through the open structure, thereby permitting such gassy ion sources to be more closely and more efficiently coupled to the AC-DC ion mass filter.

In its broadest aspect the invention provides a mass spectrometer system having a vacuum chamber, first and second sets of elongated rods in said chamber, each rod of each set being parallel to the other rods of each set and the rods of each set being spaced laterally apart a short distance from each other to define a longitudinally elongated space between the rods of each set for ions to travel through said space, said first set of rods being located end to end with said second set of rods so that said spaces are linearly aligned so that an ion may travel through both said spaces, the ends of the rods of said first set being located closely longitudinally adjacent the ends of the rods of said second set, the rods of said first set being insulated from the rods of said second set, means for applying an AC only voltage to said rods of said first set, means for applying both AC and DC voltages to the other rods of said second set, means for directing gas into the space between the rods of said first set, and means for removing gas from said chamber, at least a portion of said rods of said first set being of open structure to permit said gas to pass therethrough.

Further objects and advantages of the invention will appear from the following description, taken together with the accompanying drawings in which.

Figure 1:
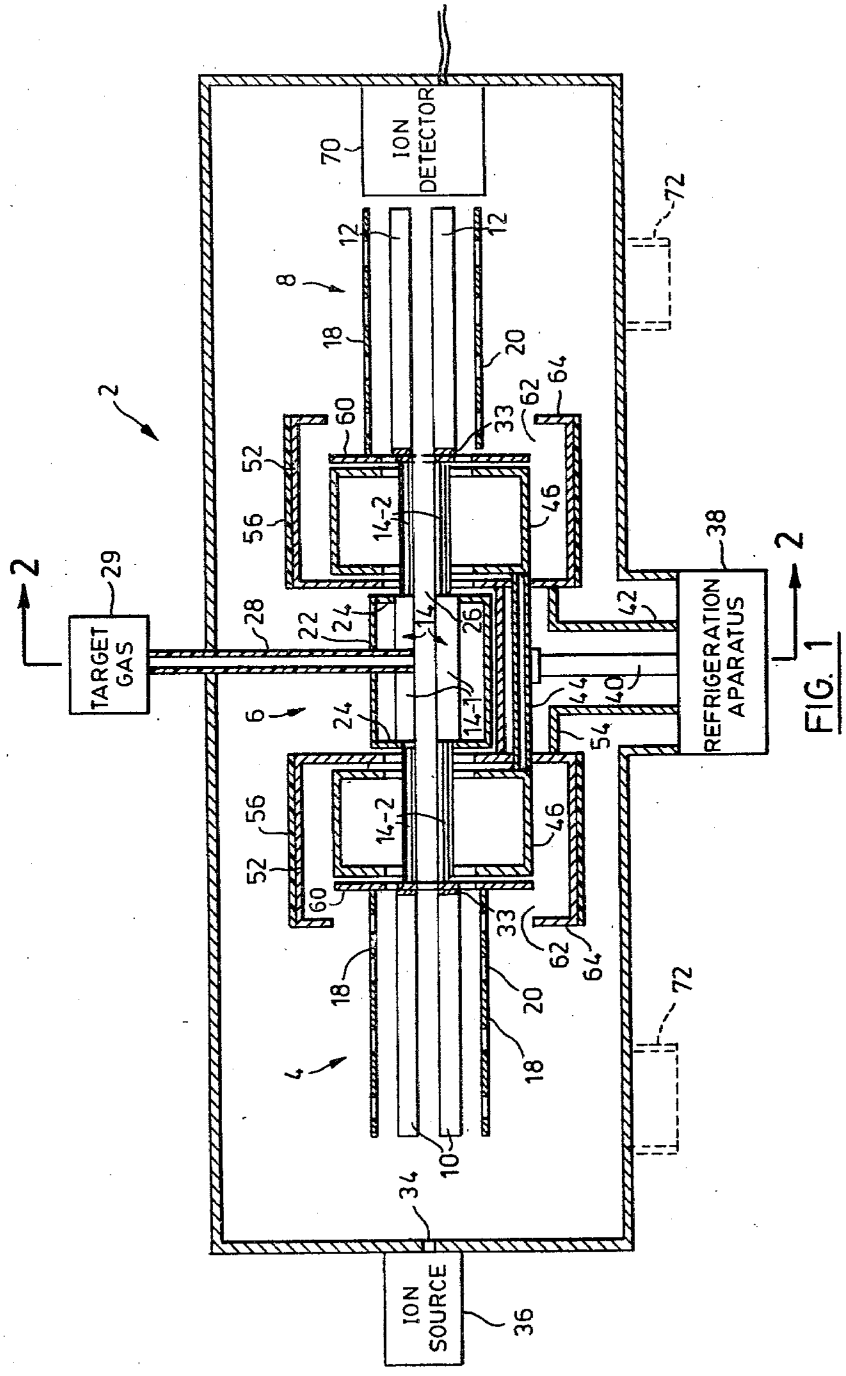
FIG. 1 is a partly diagrammatic cross sectional view of a mass spectrometer system according to the invention.
Figure 3:
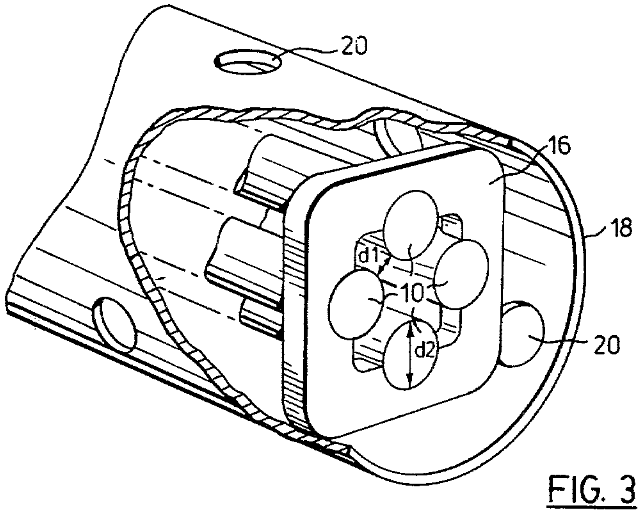
FIG. 3 is a perspective view, partly in section, showing the rods of one of the mass spectrometers of FIG. 1 mounted in a holder.

Reference is first made to FIG. 1, which shows a vacuum chamber generally indicated at 2 and which contains three mass spectrometer sections generally indicated at 4, 6, and 8 respectively. Spectrometer section 2 is a conventional quadrupole mass spectrometer and contains four rods 10 arranged in a conventional quadrupole square pattern. Spectrometer section 8 is also a conventional quadrupole mass spectrometer and similarly contains four rods 12 arranged in a normal square pattern. Spectrometer section 6 also contains four rods 14, arranged as shown in FIG. 3 in normal quadrupole fashion. However, the rods 14 have solid center portions, indicated at 14-1, and open structure end extensions, indicated at 14-2.

The center portions 14-1 of rods 14, and also the rods 10, 12 of quadrupole sections 4, 8 are held in conventional holder plates 16 (FIG. 3). The plates 16 of quadrupole sections 4, 8 are located in conventional cylindrical cans or housings 18 (FIGS. 1, 3) which are normally used for mass spectrometers. The cans or housings 18 have apertures 20 therein to allow gas within the mass spectrometer sections 4, 8 to be pumped away. The center portions 14-1 of rods 14 are however housed in a cylindrical can 32 which is closed except at its ends, which are defined by end discs 24 having apertures 26 therein. In addition a duct 28 carries a target gas from a source 29 into the can 22 and into the space between the centre portions 14-1 of rods 14.

Figure 4:
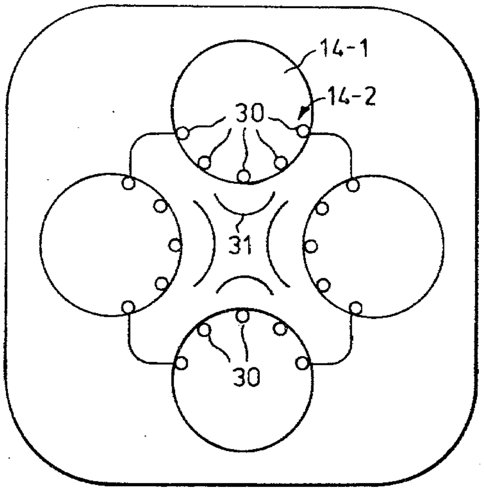
FIG. 4 is an end view showing open structure rods of the mass spectrometer system of FIG. 1.
Figure 5:
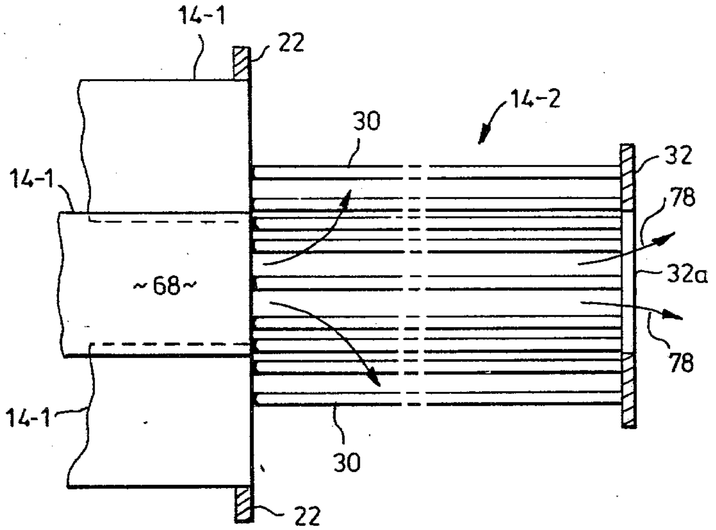
FIG. 5 is a side view showing the rods of FIG. 4.

The open structure rod extensions 14-2 of the rods 14 are formed, as shown in FIGS. 4, 5 of thin stiff rods or wires 30. Each set of wires 30 is arranged in a curved configuration to simulate the shape of the outer portion of a normal quadrupole rod so that the field produced by the four sets of wires 30 will correspond as closely as possible to the normal hyperbolic field 31 (FIG. 4) produced by the solid rods of a conventional quadrupole. The wires 30 are supported at their inner ends by welds or solder connections to the solid rod portions 14-1. At their outer ends the wires 30 are supported by a holder 32 (see especially FIG. 5) which also acts as a barrier to help limit the amount of gas from the centre quadrupole section 6 entering the end quadrupole sections 4, 8, but which has a central aperture 32 to permit ions to pass therethrough. Typically five thin wires may be used, spaced around somewhat less than half the inner circumference of the equivalent solid rod.

The three quadrupole sections 4, 6, 8 are mounted in axial alignment, end to end along the axis of the cylindrical vacuum chamber 2, being held in position by support members not shown. Each rod of each of the three sets is aligned axially with each corresponding rod of each other set, so that the spaces between the rods of each set are linearly aligned, for ions to pass therethrough. The ends of the rods 10, 12 and 14 are insulated from each other by a small air gap or thin layer of insulating material, indicated at 33.

The end wall of the vacuum chamber 2 contains an aperture 34 through which ions to be examined are supplied from an ion source 36. Ion source 36 may typically be the source shown in U.S. Pat. No. 4,148,196, in which a trace gas is admitted to an ionization chamber, ionized, and the resultant ions are drawn by appropriate electric potentials through a curtain gas chamber into the vacuum chamber 2. Curtain gas in the curtain gas chamber serves to block entry of unwanted materials into the vacuum chamber 2. Curtain gas in the curtain gas chamber serves to block entry of unwanted materials into the vacuum chamber 2, and the curtain gas, which may typically be argon or nitrogen, also enters the vacuum chamber where it is cryopumped thus permitting maintenance of a high vacuum in chamber 2.

Figure 2:
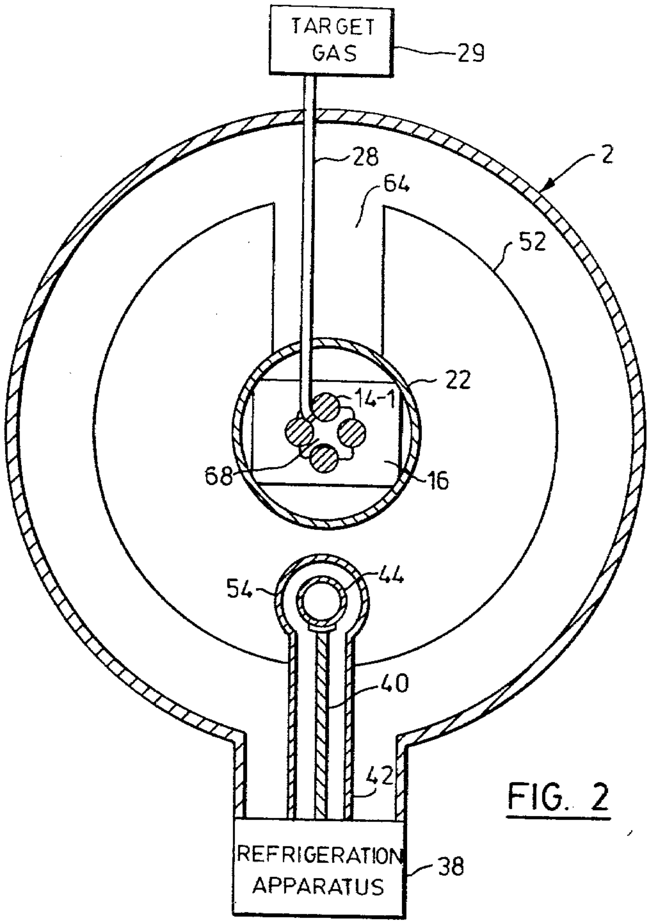
FIG. 2 is a cross sectional view of the apparatus of FIG. 1 taken along lines 2—2 of FIG. 1.

As shown in FIGS. 1 and 2, appropriate cooling means are provided to cryopump the curtain gas entering the vacuum chamber 2. Specifically, a refrigerating mechanism 38 is provided having an inner tubular finger or cold station 40 and an outer finger or second cold station 42. The mechanism 38 is typically able to extract 2 to 4 watts of thermal energy from the inner finger 40 at 12° to 20° K., and is also typically able to extract 5 to 10 watts of thermal energy from the outer finger 42, at 70° to 90° K.

A copper support tube 44 is mounted on the top of the inner finger 40, in good thermal contact therewith, and supports at each end a cylindrical shell 46, also made of a good thermal conducting material such as copper. The shells 46 have end walls 48 and contain slots (not shown) in their upper surfaces so that the center quadrupole section 6 may be fitted downwardly into the shells 46.

A pair of intermediate shells 52 are connected to the outer finger 42 and serve to reduce the heat load on the inner shells 46. The intermediate shells 52 are mounted on an outer copper support tube 54 concentric with the inner support tube 44, the outer tube 54 being mounted on the second finger 42. The exterior surfaces of the intermediate shells 52 are insulated with aluminized plastic film, as indicated at 56, to reduce heat radiation to the intermediate shells 52. The outer end walls of the intermediate shells 52 contain inset centre sections 50 spaced by annular gaps 62 from the outer end wall sections 54 and supported thereon by support struts, not shown. The gaps 62 assist in cryopumping gas from the end quadrupole sections 4, 8, as will be explained. The intermediate shells 52 also contain slots, shown at 64, FIG. 2, in thin upper surfaces to facilitate assembly of the operations.

In operation, ion species from a sample to be considered are supplied from ion source 36 and are focused (by conventional means not shown) to enter the first quadrupole section 4. In the first quadrupole section ions of the desired mass are selected and enter the central quadrupole section 6. In the central quadrupole section 6, the ions encounter a target gas supplied via duct 28 into the space 68 between the rods 14 of the center quadrupole section. The resultant collisions induce dissociation of the ions into fragments or daughter ions, which are then transmitted into the third quadrupole section 8. The third quadrupole section 8 acts as a mass filter, selecting the desired fragments or daughter ions for detection by an ion detector 70. In order to act as mass filters, the end quadrupole sections 4, 8 are supplied with conventional AC and DC voltages, but the center quadrupole section 6, which must pass a wide range of masses, has only an AC voltage applied to its rods 14. The gas pressure in the first and third quadrupole sections 4, 8 must be low, typically $10^{-5}$ torr or less for proper quadrupole operation. For this purpose the vacuum chamber 2 is pumped either by being fitted with appropriate cryocooling surfaces, as explained in U.S. Pat. No. 4,148,196, or by vacuum pump connected to ports 72 in the chamber 2. Target gas in the center quadrupole section 6, which tends to enter the space between the rods of the end quadrupole sections 4, 8, is largely pumped away by flowing through the open spaces between the wires 30 and condensing on the cooled surfaces of inner shells 46.

The advantages of the open structure of the rod extensions 14-2, formed by wires 30, are as follows. Normally in a quadrupole section the gap d1 (FIG. 3) between the rods is relatively small compared with the diameter d2 of the rods (typically d1 may be about one third of d2). Thus if the rods are solid, relatively little gas can escape between them, and therefore a substantial gap must be left between the ends of adjacent quadrupole sections, so that the gas can exit through this gap and so it will not unduly pressurize the cans of the end quadrupole sections 4, 8. For reasons to be explained, large gaps between the quadrupole sections result in substantial ion signal losses.

With the open structure rod extensions 14-2 shown, the quadrupole sections 4, 6, 8 can be placed very closely adjacent each other, the ends of the rods of each section being separated only by the small gap 33 as discussed. Since a quadrupole section having an AC-only field applied thereto requires less accuracy of manufacture than a quadrupole section having both AC and DC applied to its rods, the open structure described may be used with little or no degradation in performance. Provided that the open sections 14-2 are of reasonably substantial length, only a small proportion of the target gas entering the centre quadrupole section 6 will travel into the end sections 4, 8.

In a typical system according to the invention, the parameters of the system may be adjusted so that the gas density in the target region, i.e. in the space between rods 14-1, is in the range between $10^{-3}$ torr and $10^{-5}$ torr, and the lengths of rod extensions 14-2 are each equal to the lengths of rods 14-1 (e.g. 4 inches). Then most of the gas in the target region 68 travels outwardly through the gaps between the wires 30, as indicated by arrows 76, FIG. 5. Only a small proportion of the gas, indicated by arrows 78, is beamed directly into the space between the rods of the end quadrupole sections 4, 8. Typically the gas flow entering the spaces between the rods of the end quadrupole sections 4, 8 may be only about 1/200 of the flow through duct 28.

As indicated previously, close coupling the quadrupoles can greatly reduce ion signal transmission losses as ions travel from one quadrupole to the next, as compared with having a large gap between the quadrupole sections. As described in the co-pending application of myself and Peter M. Dawson filed concurrently herewith, it is found that ions entering or leaving a quadrupole section must pass through a fringing field in which the ions are outside the region of stable operation of the quadrupole section. If the quadrupole sections are spaced well apart, as has previously been the case, the ions leaving one quadrupole section must pass through a complete fringing field which ranges from the high value of the field existing at the end of the quadrupole rods down to zero, and then as they enter the next quadrupole section they must pass through a further complete fringing field. This causes high ion transmission losses. By placing the quadrupole sections close together, the longitudinal extent of the fringing field is greatly reduced and therefore ion losses are also reduced. Preferably the longitudinal spacing between the quadrupole sections should be $r_0$ or less, where $r_0$ is the radius of the inscribed circle within the rods 14-1 or 14-2.

In addition, as described in the said co-pending application it is found that best transmission of the ions through the quadrupole is obtained when the AC fields of the three quadrupole sections are all synchronized in frequency and in phase. Preferably there is zero phase shift between the AC fields applied to the three sections, but some small phase shift can be tolerated, typically 0.03 cycles, but in any event no more than 0.1 cycles phase shift between the fields should normally be allowed. With the quadrupole sections close coupled and the AC fields synchronized in frequency and phase, it is found that greatly improved ion transmission is achieved as compared with locating the quadrupole sections each in separate cans and spaced sufficiently far apart to permit pumping of the target gas out from the spaces between the cans, and with the AC fields not precisely synchronized in frequency and phase.

Figure 6:
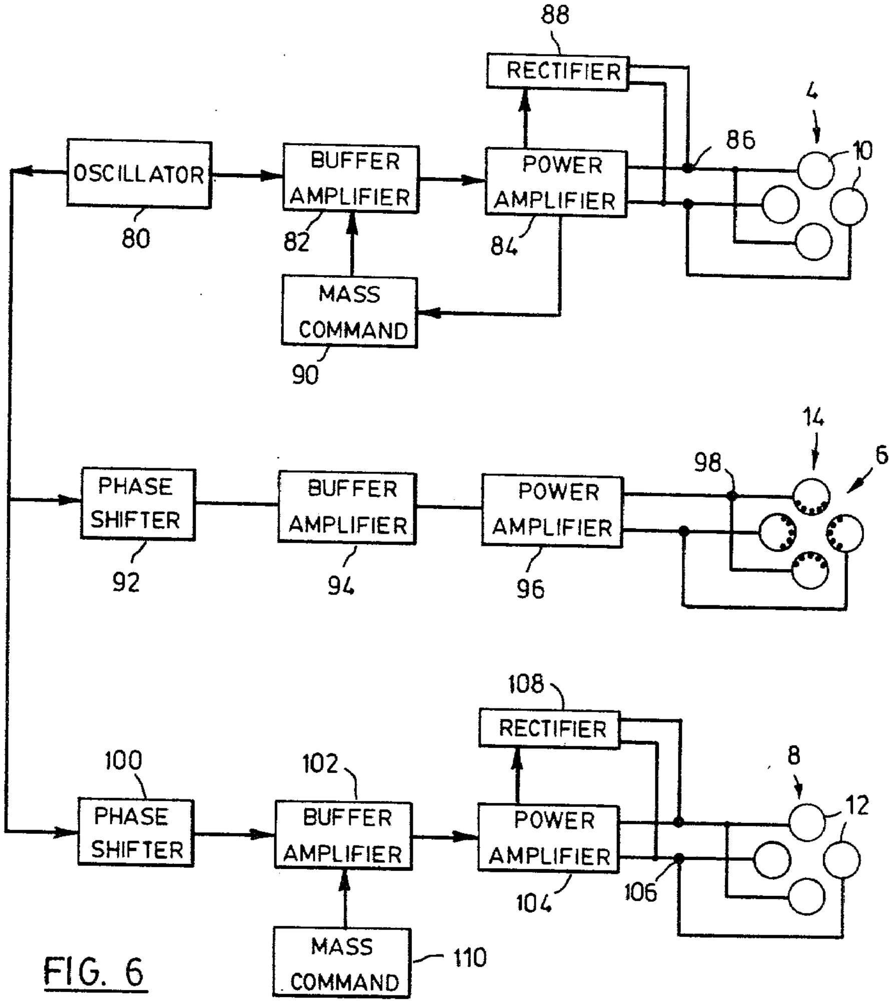
FIG. 6 is a block diagram of an electrical control system for use with the mass spectrometer system of FIG. 1.

Reference is next made to FIG. 6, which shows in block diagram form an electrical system for operating the mass spectrometer system described. As shown, an oscillator 80 is provided which produces an AC voltage of of the frequency required for mass spectrometer operation (typically 1 to 3 MHz). The AC voltage is applied through a buffer amplifier 82 (which prevents feedback) to a power amplifier 84 and to the AC terminals 86 of the first quadrupole section 4. DC is supplied by rectifying a portion of the power amplifier output in a rectifier 88 and applying the resultant DC to the terminals 86. Mass selection is controlled by a mass command unit 90, which by varying the output of buffer amplifier 82 controls the level of the AC (and hence also the DC) voltage applied to terminals 86. This changes the operating point of the first quadrupole section 4, in order to select a desired mass for transmission through the rods 10.

The oscillator 80 is also connected through a phase shifter 92 to another buffer amplifier 94. The output of amplifier 92 is connected to another power amplifier 96 which applies AC to the terminals 98 of rods 14 of the centre quadrupole section 6. No DC is applied to the rods 14. This arrangement ensures that the AC voltage applied to rods 14 is synchronized in frequency and phase with that applied to rods 10 so that the resultant AC fields are synchronized in frequency and phase. Preferably the phase shift will be zero or nearly zero.

The oscillator 80 is also connected through a second phase shifter 100 to another buffer amplifier 102. The output of buffer amplifier 102 is connected to power amplifier 104 which is connected to the AC terminals 106 of the rods 12 of the third quadrupole section 8. DC is again supplied by a rectifier 108, and the level of the voltages applied is controlled by a mass command unit 110 which adjusts the output of buffer amplifier 102. The use of phase shifter 100 again ensures that the AC voltage applied to the rods 12 is synchronized in frequency and phase with the AC voltage applied to the rods 10, 14, again so that the AC fields will be synchronized in frequency or phase. Preferably again the phase shift will be zero or nearly zero.

The DC voltage applied to the rods 10, 12 are normally in phase, but as explained in the co-pending application of myself and Peter Dawson, the DC voltages can be applied with advantage in some applications so that the DC fields produced by rods 10, 12 are 90° out of phase.

Figure 7:
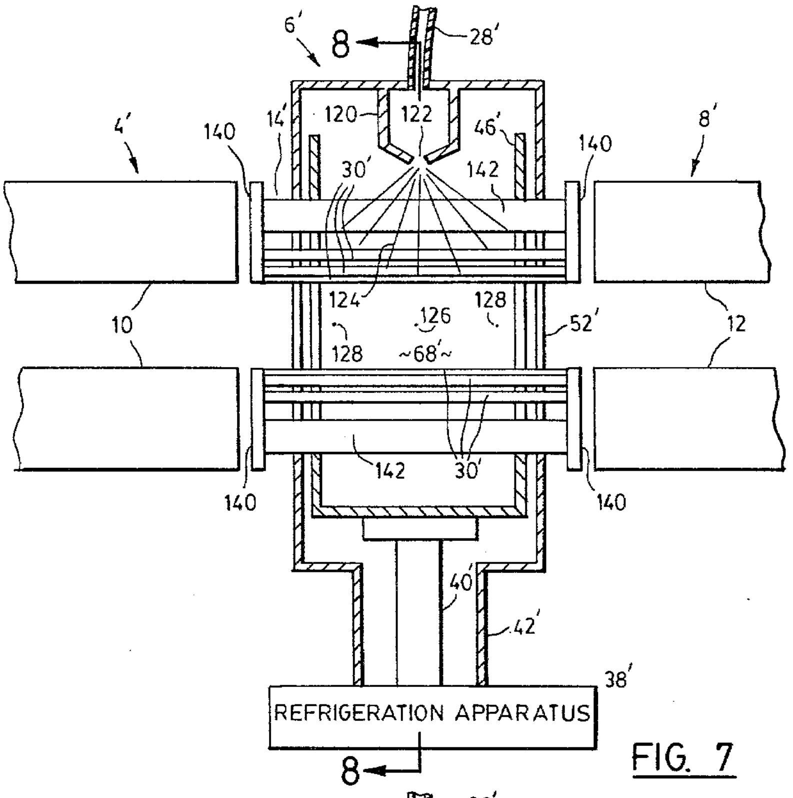
FIG. 7 is a cross sectional view showing a modification of the arrangement of FIG. 1.
Figure 8:
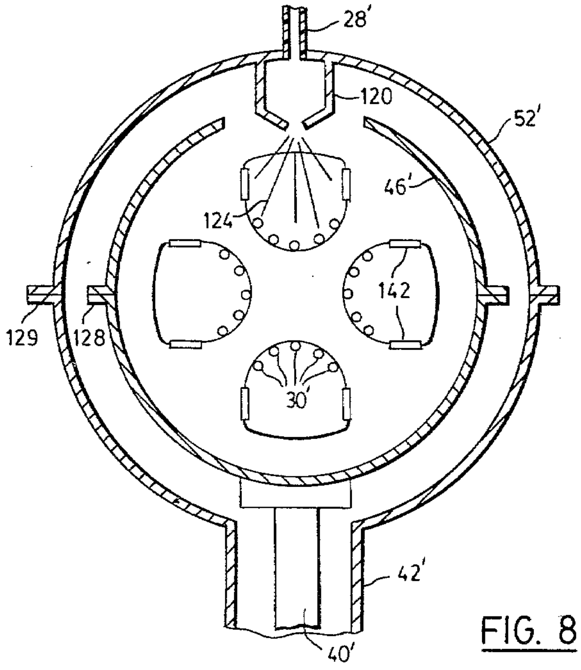
FIG. 8 is a cross sectional view taken along lines 8—8 of FIG. 7.

Reference is next made to FIGS. 7 and 8, which show a modification of the structure of FIGS. 1 to 5. In FIGS. 7 and 8 primed reference numerals indicate parts corresponding to those of FIGS. 1 to 5.

In the FIGS. 7 and 8 embodiment the rods 14' of the centre quadrupole section 6' are of open structure (formed by wires 30') along their entire length, i.e. the solid centre portions have been eliminated. The inner shells 46 have therefore been combined into a single shell 46' connected to the inner cold finger 40', and the intermediate shells 52 have been combined into a single shell 52' connected to the outer cold finger 42'.

In order to achieve sufficient gas density within the target region 68' (since there are no longer any solid rod portions to confine the gas), a high pressure free jet of target gas is provided. Specifically, gas is supplied via plastic tubing 28' to a precooling chamber 120 which is of heat conducting material (e.g. copper) and is thermally in good contact with the intermediate shell 52'. Gas flowing through tube 28' is precooled in chamber 120 and then emerges from aperture 122 of chamber 110 in the form of a free jet 124. The free jet passes through the open structure rods 14' into the target region 68' between the rods. The density distribution in the target region 68' then has generally a cosine squared distribution, being a maximum at point 126 and falling off toward the ends 128. For example, if the pressure in chamber 120 is 0.1 torr, and if aperture 122 is 0.004 inches in diameter, this typically creates a gas density equivalent to $2.5\times10^{-3}$ torr at point 126, falling to $1.38 \times 10^{-4}$ torr at points 128 (the figures are approximate).

The arrangement shown in FIGS. 7 and 8 has several advantages over that shown in FIGS. 1 to 5. In the FIGS. 1 to 5 arrangement gas travels axially through the space between the solid centre portions 14-1 and thus some gas is beamed directly at the end quadrupole sections 4, 8. In the FIGS. 7 and 8 arrangement the gas is beamed across the axis of the centre quadrupole section 6' and therefore is less likely to enter the end quadrupole sections. In addition the centre quadrupole section 6' can now be made shorter, e.g. 10 cm. instead of 30 cm. in length. This saves high frequency electric power (which is roughly proportional to the length of the rods) and also reduces the cost of the apparatus, since the vacuum chamber is now shorter.

In the FIGS. 7 and 8 arrangement the inner and intermediate shells 46', 52' are shown split into two halves each joined at flanges 128, 129, for easy assembly and disassembly.

A disadvantage of the FIGS. 7 and 8 arrangement is that each target gas molecule is effectively only used once (since it travels across the axis of the centre quadrupole section 6) rather than effectively being used more than once as in the FIGS. 1 to 5 version, where the molecules bounce generally back and forth across the target region as they migrate outward, parallel to the quadrupole axis. Therefore the FIGS. 7 and 8 arrangement requires a higher gas flow through tube 28, to achieve the same integrated target density, typically 5 to 20 times as much gas as in FIGS. 1 to 5. However the gas flows are normally very small, so the practical effect of the increased gas requirement is minor. In addition, although more pumping capacity is needed to remove the additional target gas flow, the precooling chamber 120 reduces the molecular velocity of the gas molecules typically by half, giving an effective density gain of two, i.e. for the same gas mass flow, twice the effective density is achieved in the target region 68'. In addition part of the load on the inner cooling finger 40' has been transferred to the outer cooling finger 42', which has a much higher capacity.

The remainder of the vacuum chamber 2' in the FIGS. 7 and 8 arrangement may be pumped by cryo cooling surfaces extended from the inner and outer cold fingers 40', 42', or by separate cooling surfaces connected to a separate refrigerating device.

Figure 9:
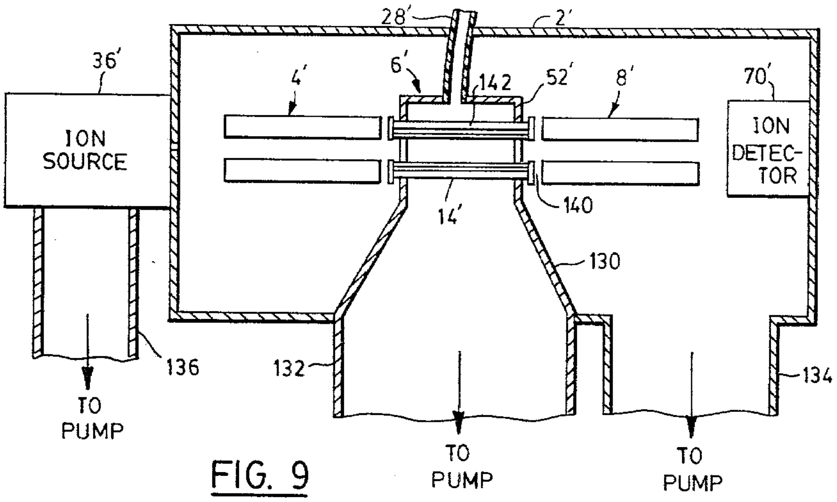
FIG. 9 is a partly diagrammatic view showing a vacuum pumping arrangement for the apparatus of FIG. 7.

If the tandem spectrometer arrangement of FIGS. 7 and 8 is pumped by conventional diffusion pumps, rather than by cryopumping, then the arrangement will typically be as shown in FIG. 9. As shown, inner shell 46' (and both cold fingers 40', 42') have been omitted and intermediate shell 52' terminates, below the quadrupole rods, in a diverging conical hood 130. Hood 130 extends to a duct 132 leading to a diffusion pump or a turbo pump (not shown). Since the gas is being beamed directly into the pump, the effective capacity of the pump is considerably increased (typically by a factor of three) over its capacity if it were handling random gas flow. The remainder of vacuum chamber 2' is pumped by a pump connected to duct 134, and the ion source 36' is pumped by a pump connected to duct 136.

Figure 10:
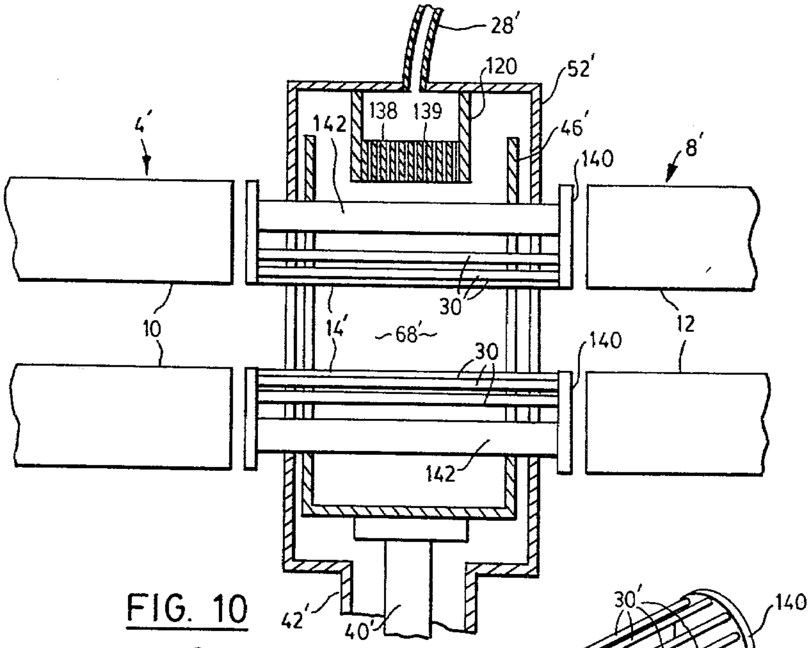
FIG. 10 is a view similar to FIG. 7 and showing a modification of the FIG. 7 arrangement.
Figure 11:
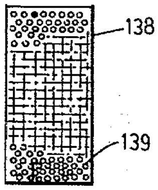
FIG. 11 is a bottom view of a portion of the FIG. 10 apparatus.

A modification of the FIGS. 7 and 8 arrangement is shown in FIGS. 10 and 11. The only change made is that the exit from precooling chamber 120 is now through a standard collimated hole structure 138, which is simply a block of metal with numerous holes 139 formed therein which create about 80% transparency. The collimated hole structure 138 produces numerous beamlets 140 of gas which, if the pressure is not too high, travel directly across the target area 68' without significant interference with each other. For example the collimated hole structure 138 can typically be operated to produce a uniform pressure of $10^{-3}$ torr in the target region 68' along the whole length of structure 138, with a fairly sharp drop-off of gas density at each end. If the pressure becomes too high, however, the beamlets 140 of gas collide with each other and scatter, producing a more diffuse pressure border.

Figure 12:
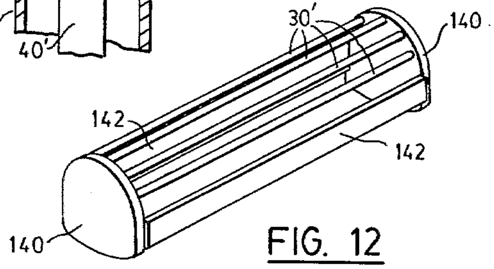
FIG. 12 is a perspective view of a rod of the FIGS. 7 to 10 apparatus.

It is normally desirable in all cases to create a high transparency of the open rod structures 14-2 or 14'. Although rod extensions 14-2 are shown as being self supporting stiff wires mounted at their ends, better transparency can be obtained by using fine wires mounted in tension. Such an arrangement is shown in FIGS. 7 to 10 and also in FIG. 12, where one of the open rods 14' is shown in detail. As shown, rod 14' consists of two end discs 140 each of an insulating material, joined together by two stiff insulating bars 142, one at each side of the discs 140. Stretched between the discs 140 are five thin wires 30'; a larger or smaller number of wires can however be used, depending on how accurately it is desired to create the field. If the rod diameter is 0.625 inch, as is typical, and if it is desired to have the open structure rod about 90% transparent, then the total wire diameter (ignoring the bars 142) will be 0.0625 inches and the diameter of each of the five wires 30' is 0.0125 inches. The wires 30' are anchored in the discs 30' by conventional means, not shown.

Alternatively a metal cylinder may be used to form each rod 14', etched to produce holes therein yielding the desired transparency. However such a structure is not preferred because of its delicacy.

An open rod structure may also be formed using the principles given in a paper by H. Matsuda and T. Matsuo entitled "A New Method of Producing an Electric Quadrupole Field", published in the International Journal of Mass Spectrometry and In Physics, No. 24, 1977 at page 107. By using such principles a quadrupole field can be produced using a number of wires suitably located, and not necessarily in the same locations as the usual solid rods themselves would assume. Such a structure can be used and a gas target region created within it, provided that there is minimal interference with gas escaping from the structure. The wires which produce a quadrupole field in effect act as rods and the term "rods" in the appended claims refers to any groups of open wires or other open structure which produces a quadrupole type field.

Preferably the transparency of the open rod structure used should not be less than about $\frac{2}{3}$, since below this value one-third or more of the gas molecules bounce off the rod structure, scatter, and increase the load on the remaining quadrupole sections. Preferably an openess or transparency of 90% or more is provided.

Figure 13:
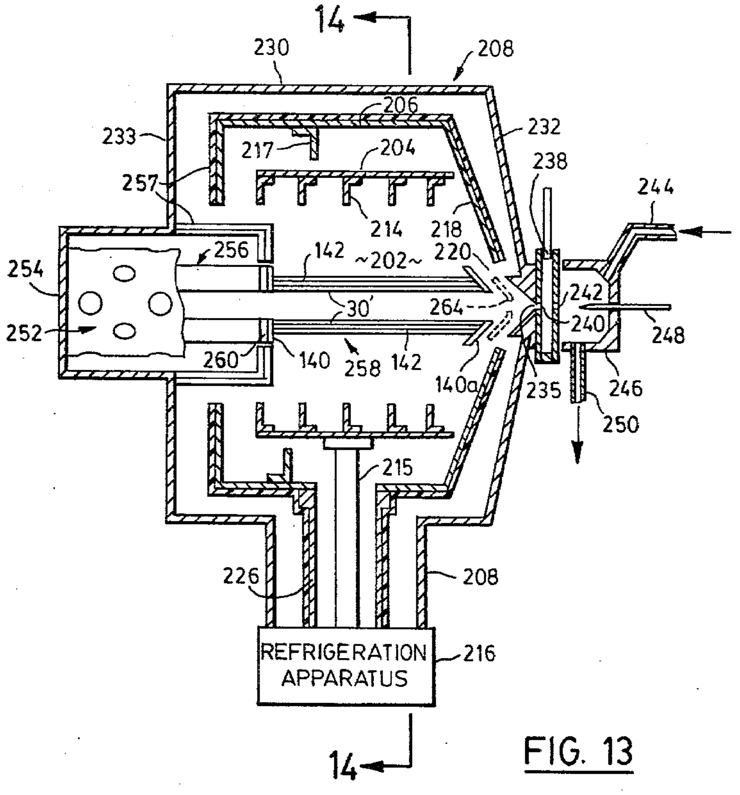
FIG. 13 is a cross sectional view of a modified mass spectrometer system according to the invention.
Figure 14:
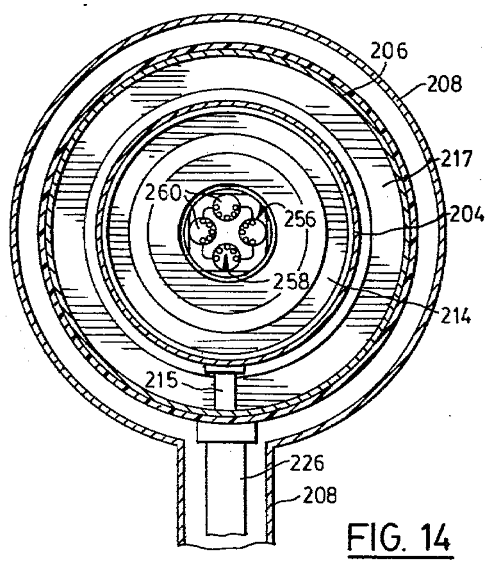
FIG. 14 is a cross sectional view taken along lines 14—14 of FIG. 13.

Reference is next made to FIGS. 13 and 14, which shows an arrangement similar to the apparatus shown in FIGS. 1 and 2 of said U.S. Pat. No. 4,148,196 except for the use of AC-only rod extensions, and which will therefore be described relatively briefly. As shown, the FIGS. 13 and 14 arrangement includes a vacuum chamber 202 which includes an inner shell 204, an intermediate shell 206 and an outer vacuum shell 208. The inner shell 204 includes spaced circumferential cooling fins 214 secured thereto and radiating inwardly therefrom, and is in good thermal contact with inner cold station 215 of refrigerating mechanism 216. The intermediate shell 206 is open at its rear and is cylindrical in form with cooling fins 217 thereon and has a conical front 218 having an enlarged axial opening 220 therein. The intermediate shell 206 is mounted on the outer finger or second cold station 226 of the refrigerating mechanism 216. The outer vacuum shell 208 has a cylindrical side wall 230 and front and rear walls 232, 233 respectively. The rear wall 233 is closed but the front wall 232 has a small central axial opening 235 therein co-axial with the opening 220. The outer shell 208 forms a gas tight enclosure around the inner and intermediate shells 204, 206 except for the front opening 235.

Connected to the front face 232 of the outer shell 208 is a gas curtain chamber 236. The gas curtain chamber 236 is closed, except for a curtain gas inlet orifice 238 at its edge walls, and except for central axial openings 240, 242 in its rear and front faces. The openings 240, 242 are axially aligned with the opening 235 so that ions can be transferred through the three openings into the vacuum chamber 202.

A sample gas containing trace components to be analyzed is introduced via inlet duct 244 into a chamber 246 which is fitted with a discharge needle 248. The trace components are ionized directly by electric discharge from the needle 248, or the ionization process may alternatively be indirect, through chemical ionization using one or more chemical reagent gases included in the sample gas. The trace ions once formed are drifted by appropriate potentials on the plates containing orifices 240, 242, through these orifices and into the vacuum chamber 202. The sample gas itself is blocked from entering the vacuum chamber by the curtain gas introduced via inlet 238 into the curtain gas chamber. The curtain gas is a conveniently inert cryopumpable gas such as argon and is admitted into the curtain gas chamber 236 at a pressure such that a portion of the curtain gas effuses out of the opening 242 to block the gases in chamber 246 from entering the vacuum system, and these gases together with the portion of the curtain gas which effuses out the opening 242, exit via an exit duct 250. A portion of the curtain gas enters the vacuum chamber with the ions to be analyzed and is cryopumped by condensation on the fins 214.

As shown, a quadrupole mass spectrometer 252 is mounted on the rear surface 254 of the vacuum chamber and is protected from the cold by insulation 257. Spectrometer 252 includes four conventional solid rods 256. A set of four open rod extensions 258, formed of wires 30′ exactly as shown in FIGS. 7 to 12, extend forwardly from the solid rods 256, being insulated therefrom by a small air gap or by insulating material 260. The rod extensions 258 serve to guide ions entering the vacuum chamber to the mass spectrometer 252 while at the same time permitting gas which enters the chamber to pass through them to condense on the cooling fins 214. For this purpose the rods 256 are supplied conventionally with AC and DC voltages, e.g. from terminals 86 of the FIG. 6 circuit, but rod extensions 258 are supplied with AC only, e.g. from terminals 98 of the FIG. 6 circuit. Again the AC voltages applied to both rod sets are synchronized in frequency and phase so that the AC fields produced by both rod sets are synchronized in frequency and phase, preferably with a zero or near zero phase shift as described previously. The AC-only rod extensions 258 are preferably relatively long, so that the ions pass through at least several complete cycles of the AC field (typically at least six cycles or more) before they reach the solid rods 256. The AC only rod extensions 258 substantially assist in guiding the ions into the solid rods 256 and at the same time create little interference with the gas flow out of the vacuum chamber. The front discs 140*a* which support the wires 301 are preferably slanted as shown to reduce interference with the gas flow from orifice 235. If desired a declustering element, shown in dotted lines at 264 in FIG. 13 and being as described in U.S. Pat. No. 4,121,099, can be placed between discs 140*a* and the orifice 235 to decluster ions entering the vacuum chamber. Element 264 also deflects much of the gas flow entering the vacuum chamber through orifice 235 away from the space between extensions 258.

What I claim as my invention is:

1. A mass spectrometer system having a vacuum chamber, first and second rod sets in said chamber, each set comprising a plurality of elongated parallel rods spaced laterally apart a short distance from each other to define an elongated space therebetween extending longitudinally through such rod set for ions to travel through said longitudinally extending space, said first rod set being located end to end with said second rod set so that said longitudinally extending spaces are linearly aligned so that an ion may travel through both said longitudinally extending spaces, the ends of the rods of said first set being located closely longitudinally adjacent the ends of the rods of said second set, the rods of said first set being electrically insulated from the rods of said second set, means for introducing ions into said longitudinally extending space of said first set, means for applying essentially an AC-only voltage to said rods of said first set, for guiding said ions through said longitudinally elongated space of said first set, means for applying both AC and DC voltages to the rods of said second set so that said second set may act as a mass filter for said ions, means for directing gas into said longitudinally elongated space of said first set, and means for removing said gas from said chamber, at least some of said rods of said first set having openings formed therein and extending laterally therethrough to permit said gas to pass laterally through such rods, thus to increase the rate of removal of said gas from said longitudinally extending space of said first set and hence to reduce the amount of said gas which may enter said longitudinally extending space of said second set from said longitudinally extending space of said first set.

2. A mass spectrometer system according to claim 1 in which said rods of said second set are each of solid construction and all of the same diameter and each rod of said first set comprises a set of thin wires, each wire being of substantially smaller diameter than the diameter of a rod of said second set and said wires being spaced laterally apart to define said openings therebetween.

3. A mass spectrometer system according to claim 1 wherein each rod of said first set is aligned with a corresponding rod of said second set.

4. A mass spectrometer system according to claim 3 wherein each set of rods is a quadrupole set having four rods.

5. A mass spectrometer system according to claim 2 and including an end plate located at the end of said first set of rods adjacent the end of said second set of rods, said end plate serving to support said wires and to reduce longitudinal flow of gas from said first set of rods to said second set of rods, said end plate having an aperture therein to permit ions to travel therethrough.

6. A mass spectrometer system according to claim 1 wherein each rod of said first set has a solid first portion of substantially the same diameter as each rod of said second set, and a second portion having said openings therein located end to end with said first portion and electrically connected thereto.

7. A mass spectrometer according to claim 1 wherein said chamber includes an inlet aperture, said means for admitting gas and said means for introducing ions together comprising means connected to said chamber for admitting ions and said gas through said aperture with said ions being in said gas, said first and second sets of rods being aligned with said aperture to receive said ions therefrom, said second set of rods being spaced from said aperture and said first set of rods being located between said second set of rods and said aperture.

8. A mass spectrometer system according to claim 7 wherein said means for removing said gas from said chamber includes an interior surface in said chamber and substantially encircling said first set of rods, said gas being essentially a gas which, when deposited in solid phase, has a vapour pressure substantially less than atmospheric at a predetermined temperature, said means for removing said gas further including refrigeration means for cooling said surface to said predetermined temperature to deposit said gas in solid phase on said surface, whereby at least some of said gas flows outwardly through said rods of said first set and condenses on said surface.

9. A mass spectrometer system according to claim 1 and including a third rod set in said chamber, said third rod set comprising a plurality of elongated parallel rods spaced laterally apart a short distance from each other to define an elongated space therebetween extending longitudinally through said third set for ions to travel therethrough, said third rod set being located end to end with said first rod set so that said first rod set is located between said second and third sets and so that the spaces of all three sets are linearly aligned for an ion to travel through all three said longitudinally extending spaced, the ends of the rod of said third set being located closely longitudinally adjacent the ends of the rods of said first set, the rods of said third set being electrically insulated from the rods of said first and second sets, means for introducing ions into said longitudinally extending space of said third set, and means for applying both AC and DC voltages to the rods of said third set for said third set to act as a mass filter to transmit selected ones of said ions into said longitudinally extending space of said first set.

10. A mass spectrometer system according to claim 9 wherein each of said first, second and third sets is a quadrupole set having four rods.

11. A mass spectrometer system according to claim 10 wherein each rod of each set is aligned with a corresponding rod of each other set; said rods of said second and third sets are each of solid construction and all of the same diameter; and each rod of said first set comprises a set of thin wires, each wire being of substantially smaller diameter than the diameter of a rod of said second or third sets, said wires being spaced laterally apart to define said openings therebetween.

12. A mass spectrometer system according to claim 9, wherein each rod of said first set comprises a solid center portion of substantially the same diameter as each rod of said second and third sets, and a pair of end extensions one extending from each end of said center portion, said end extensions having said openings therein, said means for introducing gas including means for introducing said gas into the longitudinally extending space between said center portions of said rods of said first set, whereby at least a portion of said gas will flow longitudinally through said longitudinally extending space between said center portions and may flow laterally outwardly through said openings in said end extensions.

13. A mass spectrometer system according to claim 1 wherein said means for directing gas into said longitudinally extending space between the rods of said first set includes means for directing the flow of said gas substantially across said space, at a substantial angle to the axis of said rods.

14. A mass spectrometer system according to claim 8 including means for precooling said gas to a temperature substantially below room temperature but above said predetermined temperature prior to introducing said gas into said space between the rods of said first set.

15. A mass spectrometer system according to claim 14 wherein said means for directing gas into said longitudinally extending space between the rods of said first set includes means for directing the flow of said gas substantially across said space, at a substantial angle to the axis of said rods.

16. A method operating a mass spectrometer system for analyzing ions, comprising:

(a) introducing said ions from a gaseous region into a vacuum chamber through an orifice in said chamber, said orifice communicating with said chamber,
(b) maintaining a vacuum in said chamber and maintaining a gas in said gaseous region at a higher pressure so that said gas passes through said orifice with said ions and expands into said chamber,
(c) directing said ions and at least some of said gas into a first set of spectrometer rods and directing said ions from said first set of spectrometer rods into a second set of spectrometer rods for mass filtering in said second set of rods,
(d) applying essentially an AC-only voltage to said first set of rods and both AC and DC voltages to said second set of rods, so that said first set of rods acts to guide said ions into said second set of rods,
(e) and directing at least some of said gas which enters the space between the rods of said first set through openings formed in each rod of said first set and extending laterally through such rods so that such gas may escape laterally from between the rods of said first set through said openings.

17. A method operating a tandem mass spectrometer system for analyzing ions, comprising:

(a) directing ions into the third of an array of first, second and third sets of mass spectrometer rods arranged in tandem, with said first set located between said second and third sets,
(b) applying AC and DC voltages to said second and third sets and essentially an AC-only voltage to said first set for said second and third sets to perform mass filtering and for said first set to tend to guide ions and fragments thereof from said third to said second set,
(c) directing a target gas into the space between the rods of said first set to perform ion fragmentation in said space,
(d) and directing at least some of said target gas out of said space through openings formed in each rod of said first set and extending laterally through such rods.

* * * * *